(12) United States Patent
Yoshida (10) Patent No.: US 7,163,476 B2
(45) Date of Patent: Jan. 16, 2007

(54) BELT TYPE CONTINUOUSLY VARIABLE TRANSMISSION

(75) Inventor: Hideaki Yoshida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 486 days.

(21) Appl. No.: 10/757,554

(22) Filed: Jan. 15, 2004

(65) Prior Publication Data

US 2004/0162173 A1   Aug. 19, 2004

(30) Foreign Application Priority Data

Jan. 23, 2003   (JP)   ............................. 2003-014413

(51) Int. Cl.
*F16H 55/56*   (2006.01)
(52) U.S. Cl. .......................................... 474/8; 474/201
(58) Field of Classification Search ..................... 474/8, 474/18, 28, 201, 203
See application file for complete search history.

(56) References Cited

U.S. PATENT DOCUMENTS 4,631,042 A * 12/1986 Rattunde ........................ 474/8
6,652,403 B1 * 11/2003 Drees et al. ................. 474/201

FOREIGN PATENT DOCUMENTS

JP    2002-31215    1/2002

* cited by examiner

*Primary Examiner*—Vicky A. Johnson
(74) *Attorney, Agent, or Firm*—Arent Fox PLLC (57) ABSTRACT

In a belt type continuously variable transmission having a variable width drive pulley, a variable width driven pulley, and a metal V belt, which is disposed around the drive and driven pulleys, the contour of the surfaces (V faces) in contact with the metal V belt in the cross-sectional view through the axes of the drive and driven pulleys is an arc that has a first radius of curvature rp and is convex to the metal V belt. The contour of the surfaces (V faces) in contact with these two pulleys in the cross-sectional view perpendicular to the longitudinal direction of the metal V belt is an arc that has a second radius of curvature re and is convex to the drive and driven pulleys.

10 Claims, 9 Drawing Sheets

BELT TYPE CONTINUOUSLY VARIABLE TRANSMISSION

RELATED APPLICATIONS

This application claims the priority of Japanese Patent Application No. 2003-014413 filed on Jan. 23, 2003, which is incorporated herein by reference.

FIELD OF THE INVENTION

The present invention relates generally to a belt type continuously variable transmission that comprises a variable width drive pulley, a variable width driven pulley and a V belt, which is disposed around these pulleys.

BACKGROUND OF THE INVENTION

Various such belt type continuously variable transmissions and their control systems have been proposed and put into practical use. A typical belt type continuously variable transmission comprises a drive-pulley actuator, which is used to adjust the width of the drive pulley, and a driven-pulley actuator, which is used to adjust the width of the driven pulley, in axial thrust control. With these actuators, the axial thrusts applied on the drive pulley and the driven pulley are controlled to adjust the widths of the pulleys for controlling the speed change ratio of the transmission, which transmits the power of the engine to the drive wheels of a vehicle by the V belt disposed around the drive and driven pulleys.

Figure 9:
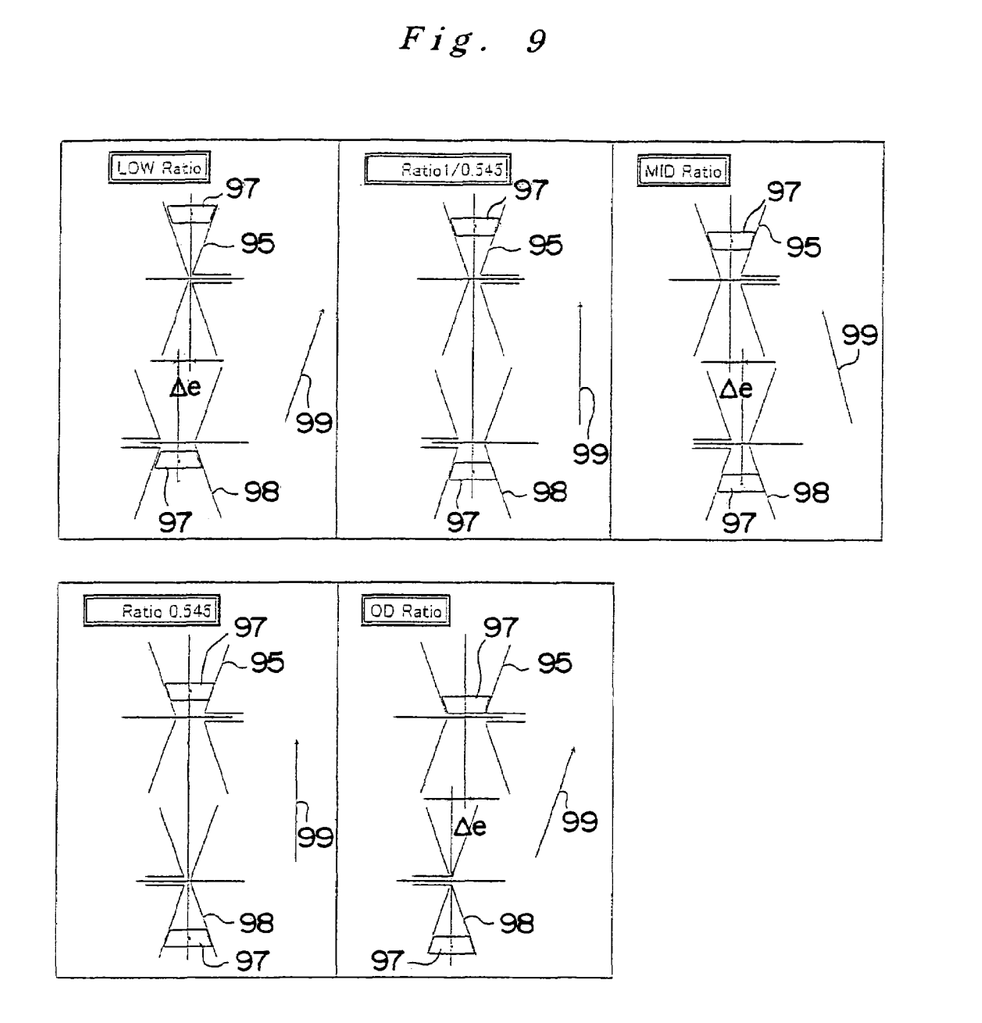
FIG. 9 describes the misalignment of the V belt, which is evident when the V faces of the drive and driven pulleys and the elements are configured linear.

FIG. 9 describes deviations $\Delta e$ of the center of the V belt 97 in its longitudinal direction in sectional views that pass through the axes of the drive pulley 98 and the driven pulley 95. Here, the surfaces of the V belt 97 in contact with the drive and driven pulleys 98 and 95 (hereinafter referred to as "V faces") are formed linear in cross-sectional view. As shown in FIG. 9, while the speed change ratio of the transmission is varied from the minimum ratio (Low ratio) through the middle ratio (MID ratio) to the maximum ratio (OD ratio), the V belt 97 is being shifted in the direction of the axes of the drive and driven pulleys 98 and 95, which change their widths in relation to the speed change ratio. It should be noted that the amount or distance of the V belt 97 shifted on the drive pulley 98 and that on the driven pulley 95 are different such that the longitudinal center of the V belt 97 deviates laterally by $\Delta e$, resulting in the direction of the V belt 97 swinging laterally (this deviation of the longitudinal center of the V belt 97 is hereinafter referred to as "misalignment").

While the V belt is misaligned, uneven abrasion occurs in the surfaces (V faces) of the V belt in contact with the drive and driven pulleys. Moreover, the above mentioned twisting of the V belt impairs the durability of the V belt. To alleviate or eliminate such misalignment of the V belt, drive and driven pulleys whose V faces are formed with a curve have been known (refer to, for example, Japanese Laid-Open Patent Publication No. 2002-31215).

However, if the curvature of the V faces of the drive and driven pulleys is excessive, the Hertz stress (compressive stress) at the part in contact with the V belt becomes large enough to cause a chipping or an abnormal abrasive wear in the V faces, resulting in a remarkable decrease in durability. In addition, if the V faces are defined by a complicated mathematical function, then the production of the drive and driven pulleys and the V belt becomes difficult.

Furthermore, if the distance that the points in contact between the V belt and the drive and driven pulleys travel while the speed change ratio is varied is not defined (this distance is hereinafter referred to as "contact lengths"), then optimal contact condition is not achieved. In this case, a contact can occur at an edge of the V faces of the V belt, and this condition leads to an abnormal abrasion and results in the transmission not achieving a sufficient range of speed change ratio.

SUMMARY OF THE INVENTION

The present invention is to solve these problems. It is an object of the present invention to provide a belt type continuously variable transmission that can maintain optimal contact condition between the V faces of the drive and driven pulleys and the V belt which are formed with a convex arc.

A belt type continuously variable transmission according to the present invention comprises a variable width drive pulley, a variable width driven pulley, and a V belt (for example, the metal V belt 7 described in the following embodiment), which is disposed around the drive and driven pulleys. In this transmission, the contour of the surface (for example, the V faces 11 described in the following embodiment) in contact with the V belt in the cross-sectional view through the axes of the drive and driven pulleys is an arc that has a first radius of curvature rp and is convex to the V belt, and the contour of the surface (for example, the V faces 46 described in the following embodiment) in contact with the drive and driven pulleys in the cross-sectional view perpendicular to the longitudinal direction of the V belt is an arc that has a second radius of curvature re and is convex to the contact surfaces of the drive and driven pulleys. In the transmission, the contact point moving on the contact surfaces of the drive and driven pulleys and the V belt for a speed ratio change satisfies the following equation:

$$\Delta le/\Delta lp = re/rp$$

In this equation, the $\Delta lp$ is a distance (contact length) over which the contact point migrates in the cross-sectional view through the axes of the drive and driven pulleys, and the $\Delta le$ is a distance (contact length) over which the contact point migrates in the cross-sectional view perpendicular to the longitudinal direction of the V belt.

By the above described arrangement, the drive and driven pulleys and the V belt are always kept in optimal contact condition to achieve a sufficient range of speed change ratio. As a result, the drive and driven pulleys and the V belt will not experience abnormal abrasion. Because the contact surfaces are formed simply as an arc, the production of these components are relatively easy.

It is preferable that the ratio of the radius of curvature re of the V belt to the radius of curvature rp of the drive and driven pulleys satisfy the following equation:

$$0.02 < re/rp < 0.12$$

In this way, a restraint is provided against the Hertz stress at the point in contact between the drive and driven pulleys and the V belt, which stress can otherwise become excessive. This is advantageous for achieving a good speed change ratio.

It is preferable that the center of the arc forming the surface in contact with the V belt in the cross-sectional view through the axes of the drive and driven pulleys be positioned away from the axes of the drive and driven pulleys.

By this arrangement, the V faces of the drive and driven pulleys, which are the surfaces in contact with the V belt, are formed as a segment of a circle and not as a complicated function.

Furthermore, preferably, the V belt comprises a plurality of elements, which are connected in series, and a ring, which is placed on saddle faces of the elements. In this V belt, it is preferable that the center of the arc forming the surface in contact with the drive and driven pulleys in the cross-sectional view perpendicular to the longitudinal direction of the V belt be positioned away from the upper ends of the saddle faces.

By this arrangement, also, the V faces of the elements, which are the surfaces in contact with the drive and driven pulleys, are formed as a segment of a circle and not as a complicated function.

In addition, it is preferable that the contact surfaces of the drive and driven pulleys and the V belt be configured such that the center of the V belt in its longitudinal direction is always perpendicular to the axes of the pulleys irrespective of the condition of the speed change ratio.

By this arrangement, the V belt is protected against misalignment and thereby against abnormal abrasion and twisting. As a result, the durability of the V belt is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 5 shows an element constituting the metal V belt, FIG. 5A being a front view and FIG. 5B being a side view.

DESCRIPTION OF THE PREFERRED EMBODIMENTS

Figure 1:
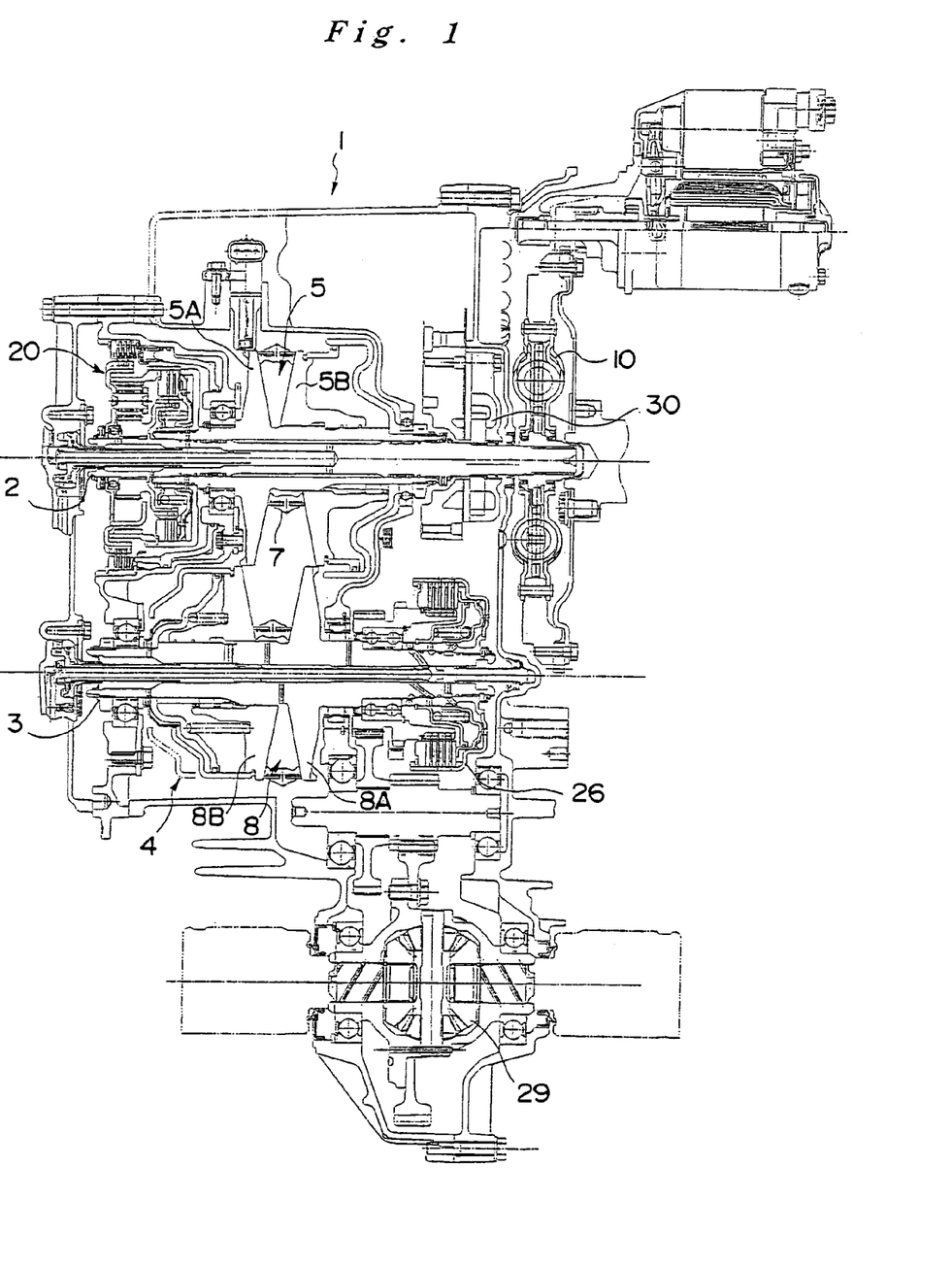
FIG. 1 is a whole cross-sectional view of a belt type continuously variable transmission, describing the internal power-transmission mechanism, as a preferred embodiment according to the present invention.
Figure 2:
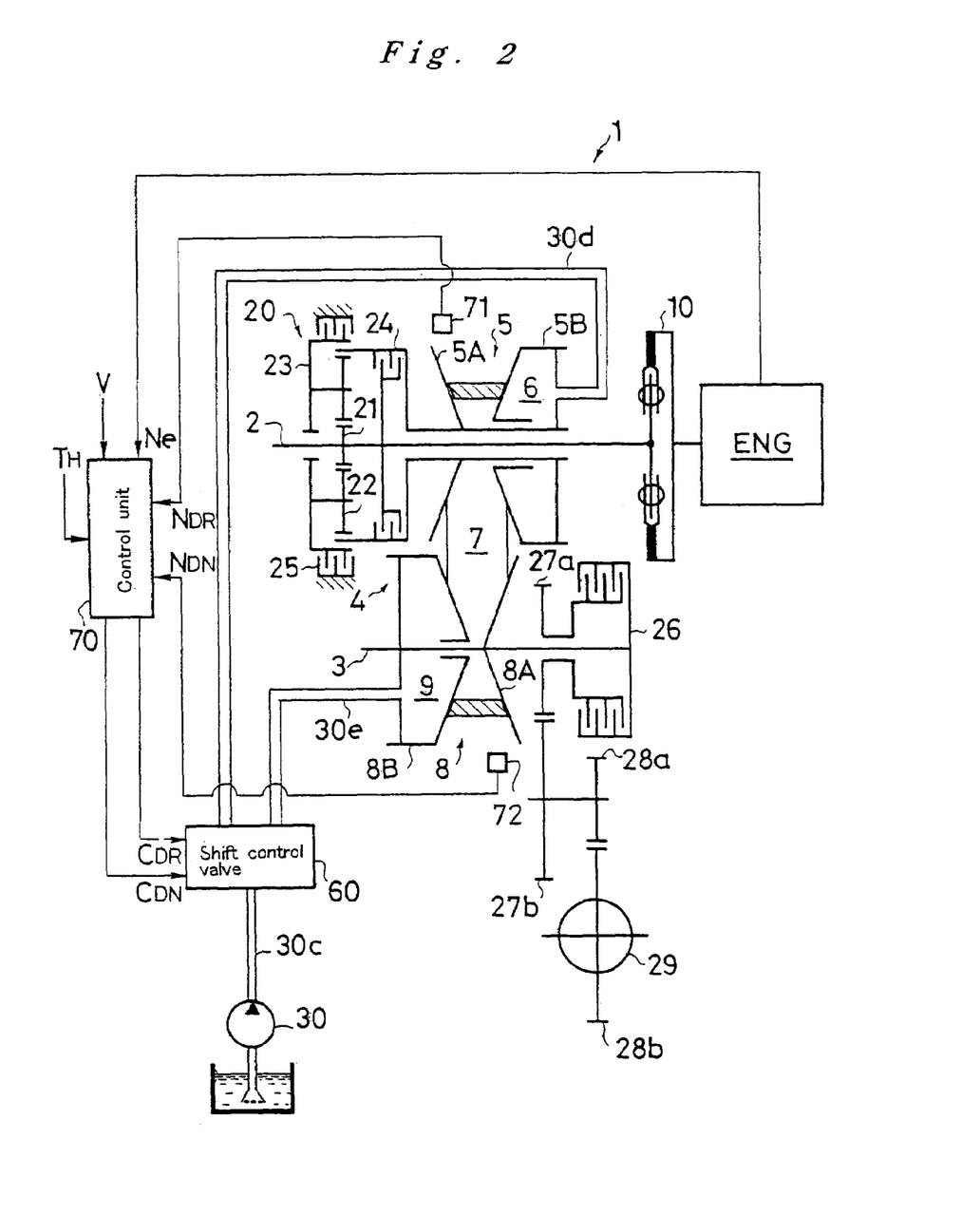
FIG. 2 is a skeleton diagram describing the power-transmission paths of the belt type continuously variable transmission.

Now, a preferred embodiment of the present invention is described in reference to the drawings. FIG. 1 and FIG. 2 show a whole view of a belt type continuously variable transmission 1 according to the present invention. The belt type continuously variable transmission (CVD 1 comprises a transmission input shaft 2, a countershaft 3, a metal V belt mechanism 4 and a planetary gear type forward/reverse switching mechanism 20. The input shaft 2 is connected through a flywheel damper 10 to the engine ENG, and the countershaft 3 is disposed in parallel with the input shaft 2. The metal V belt mechanism 4 is disposed around these shafts 2 and 3, and the planetary gear type forward/reverse switching mechanism 20 is placed over the input shaft 2. The belt type continuously variable transmission 1 is equipped with a hydraulic pump 30 and a shift control valve 60 for speed ratio control, and hydraulic oil being supplied from the hydraulic pump 30 through oil passages 30c~30e to the shift control valve 60 is used to control the metal V belt mechanism 4.

The metal V belt mechanism 4 comprises a drive pulley 5, a driven pulley 8 and a metal V belt 7. The drive pulley 5 is disposed rotatably on the input shaft 2 while the driven pulley 8 is fixed on the countershaft 3 so that the driven pulley 8 rotates together with the countershaft 3 as a unit. The metal V belt 7 is disposed between and around these pulleys 5 and 8.

Figure 4:
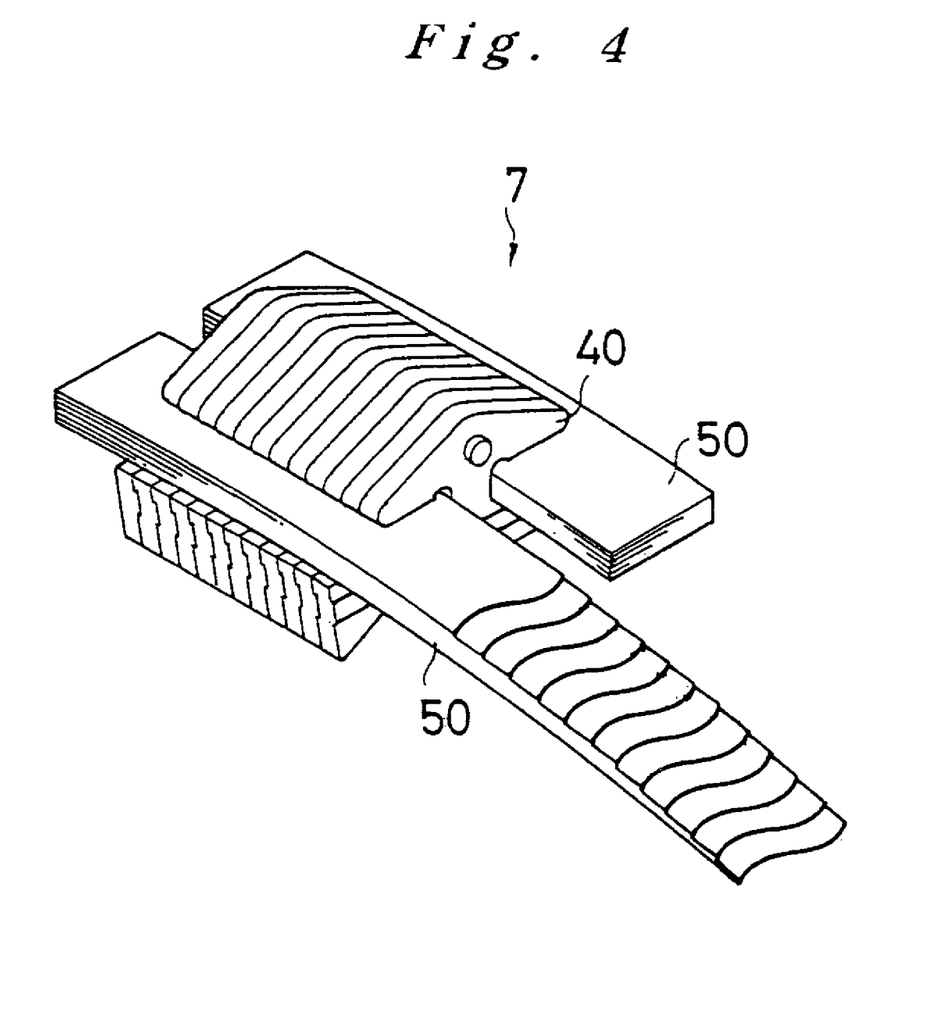
FIG. 4 is a perspective view of the metal V belt.

As shown in FIG. 4, the metal V belt 7 comprises a plurality of elements 40, which are attached in series, and two bundles of rings 50, which are held in the elements 40. As shown in FIG. 5, each element 40 is plate-like and has a head portion 41, a neck portion 43 and a body portion 44. The head portion 41 includes laterally extending right and left ear portions 42, and the neck portion 43 connects the head portion 41 with the body portion 44, which extends laterally rightward and leftward. The head portion 41 is provided with a nose hole 41a, which is used for the series connection of the elements 40. The right and left sides of the body portions 44 constitute V faces 46, which come into contact with and are held by the V faces 11 of the drive and driven pulleys 5 and 8. The rings 50 are held between the right and left ear portions 42 and the upper parts (saddle faces 45) of the body portions 44.

Figure 3:
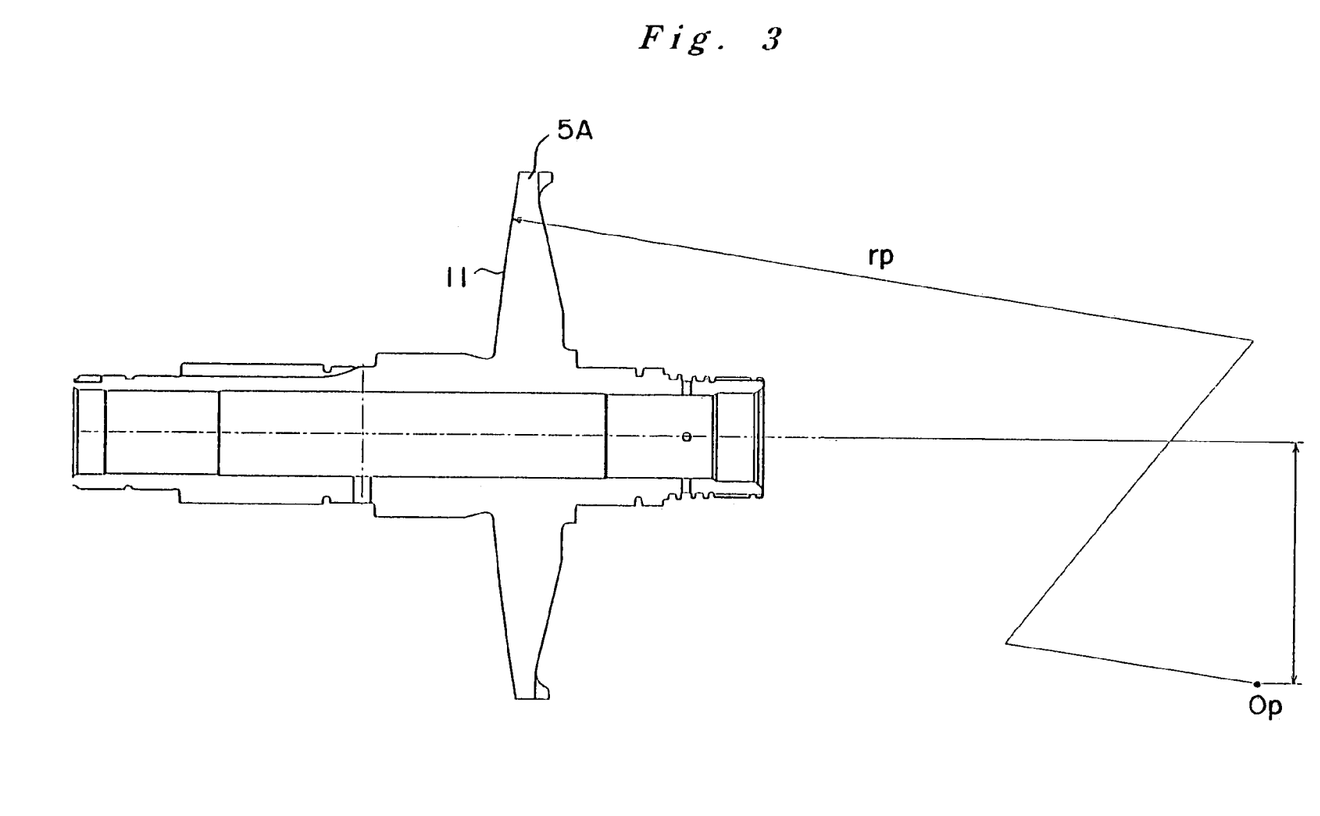
FIG. 3 is a sectional view of the stationary pulley half of the drive pulley.

The drive pulley 5 comprises a stationary pulley half 5A and a movable pulley half 5B. The stationary pulley half 5A is disposed rotatably on the input shaft 2, and the movable pulley half 5B is movable axially with respect to the stationary pulley half 5A. The drive pulley 5 further comprises a drive-side cylinder chamber 6, which is provided laterally to the movable pulley half 5B. The pressure of the oil supplied from the shift control valve 60 through an oil passage 30d into the drive-side cylinder chamber 6 generates a thrust in the axial direction of the pulley (drive pulley axial thrust), and this thrust moves the movable pulley half 5B axially. As shown in FIG. 3, a V face 11 is provided at the part of the stationary pulley half 5A where the metal V belt 7 comes into contact, and a V face 11 is provided also at the part of the movable pulley half 5B that faces the stationary pulley half 5A. The metal V belt 7 is held by the V faces 11 of the stationary and movable pulley halves 5A and 5B.

The driven pulley 8 comprises a stationary pulley half 8A and a movable pulley half 8B. The stationary pulley half 8A is fixed on the countershaft 3, and the movable pulley half 8B is movable axially with respect to the stationary pulley half 8A. The driven pulley 8 further comprises a driven-side cylinder chamber 9, which is provided laterally to the movable pulley half 8B. The pressure of the oil supplied from the shift control valve 60 through an oil passage 30e into the driven-side cylinder chamber 9 generates a thrust in the axial direction of the pulley (driven pulley axial thrust), and this thrust moves the movable pulley half 8B axially. In the same way as the drive pulley 5, the driven pulley 8 is also provided with V faces 11, and the metal V belt 7 is held by the V faces 11 of the stationary and movable pulley halves 8A and 8B.

The hydraulic pressures (pulley thrust pressures) of the drive-side cylinder chamber 6 and the driven-side cylinder chamber 9 are controlled to adjust the thrusts so that no slippage of the metal V belt 7 can occur (this thrust is referred to as "slip prevention thrust"). The pulley thrust pressures are also controlled to adjust the thrusts that continuously vary the widths of the drive and driven pulleys 5 and 8. As a result, the radii of the contact circles of the metal V belt 7 on the pulleys 5 and 8 are varied continuously to control the change of the speed change ratio of the transmission continuously with no step.

The planetary gear type forward/reverse switching mechanism 20 comprises a forward drive clutch 24 and a single pinion type planetary gear mechanism, which includes a sun gear 21, a carrier 22 and a ring gear 23. The sun gear 21 is connected to the transmission input shaft 2, and the carrier 22 is connected to the stationary pulley half 5A of the drive pulley 5. The ring gear 23 is arranged to be fixed stationary by a rearward drive brake 25, and the forward drive clutch 24 is arranged to couple the sun gear 21 with the ring gear 23. With this construction, while the forward drive clutch 24 is engaged, the sun gear 21, the carrier 22 and the ring gear 23 are rotated together with the input shaft 2 in unison. As a result, the drive pulley 5 rotates in the same direction as the input shaft 2 (in the forward drive direction). On the other hand, while the rearward drive brake 25 is engaged, the ring gear 23 is held stationary. As a result, the carrier 22 rotates in the direction opposite to that of the sun gear 21 (in the rearward drive direction).

As described above, the rotational power of the engine ENG is transmitted through the metal V-belt mechanism 4 and the planetary gear type forward/reverse switching mechanism 20 to the countershaft 3 with a rotational change. Then, this rotational power is transmitted through a starting clutch 26 and gears 27a, 27b, 28a and 28b to a differential mechanism 29 and then divided therein to rotate right and left wheels (not shown).

As mentioned above, the shift control valve 60 is used to control the hydraulic pressures supplied to the drive-side cylinder chamber 6 and the driven-side cylinder chamber 9, respectively, for controlling the speed change ratio of the transmission. The actuation of the shift control valve 60 is controlled by a shift control unit 70, which sends shift control signals CDR and CDN.

The shift control valve 60 comprises two solenoid valves, which are used to control the hydraulic pressures supplied to the drive-side cylinder chamber 6 and the driven-side cylinder chamber 9, respectively. The actuations of these solenoid valves are controlled by the shift control unit 70 with the shift control signals CDR and CDN, which are sent from the control unit to the solenoid valves. In response to these control signals, the solenoid valves adjust the hydraulic pressures of the drive-side cylinder chamber 6 and the driven-side cylinder chamber 9, respectively, these pressures producing the above mentioned drive and driven pulley axial thrusts in the drive pulley 5 and the driven pulley 8, respectively. For controlling the speed change ratio of the transmission, the shift control unit 70 receives signals that indicate the rotational speed Ne of the engine, the degree of the throttle opening TH, the speed of the vehicle V, the rotational speed of the drive pulley NDR, which is detected by a drive pulley rotational speed detector 71, and the rotational speed of the driven pulley NDN, which is detected by a driven pulley rotational speed detector 72.

Figure 6:
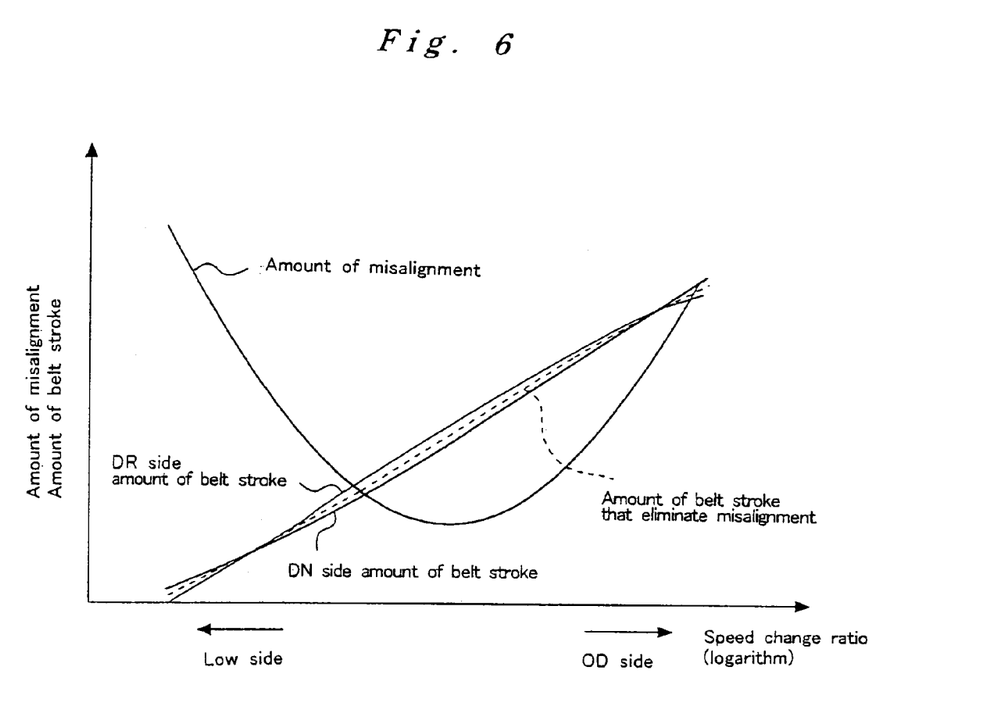
FIG. 6 is a graph showing the amount of belt stroke and the amount of misalignment of the metal V belt mechanism in relation to the change of the speed change ratio.

As mentioned in the above section of "BACKGROUND OF THE INVENTION", if the V faces 11 and 46 of the drive and driven pulleys 5 and 8 and the metal V belt 7 (elements 40) were formed linear, then there must be a difference between the amount of belt stroke of the metal V belt 7 on and around the drive pulley 5 (DR side) and that of the metal V belt 7 on and around the driven pulley 8 (DN side), the amount of belt stroke being the amount or distance of the metal V belt 7 shifting along the axis of a corresponding pulley. If such were the case, the metal V belt 7 would be misaligned (refer to FIG. 6). However, according to the present invention, the contour of the V faces 11 of the pulleys 5 and 8 in the cross-sectional view through the axes of the pulleys and the contour of the V faces 46 of the elements 40 in the cross-sectional view perpendicular to the longitudinal direction of the metal V belt 7 are configured as arcs that are convex toward each other. Because of this configuration, the amount of belt stroke of the metal V belt 7 on and around the drive pulley 5 and that of the metal V belt 7 on and around the driven pulley 8 are made equal to each other. As a result, the longitudinal center of the metal V belt 7 is always oriented perpendicular to the axes of the drive and driven pulleys 5 and 8, so misalignment is eliminated. By the way, by designing the sectional contours of the V faces 11 and 46 of the pulleys 5 and 8 and the elements 40 in arcs, the production of these components is kept relatively simple.

Since the V faces 11 and 46 of the drive and driven pulleys 5 and 8 and the elements 40 are formed in arcs, optimal contact condition is achieved because the center Op of the arc of the V face 11 of the drive or driven pulley 5 or 8, the center Oe of the arc of the V face 46 of the elements 40, and the contact point between the drive or driven pulley 5 or 8 and the elements 40 are all aligned in straight line irrespective of the speed change ratio of the transmission.

Figures 7A, 7B:
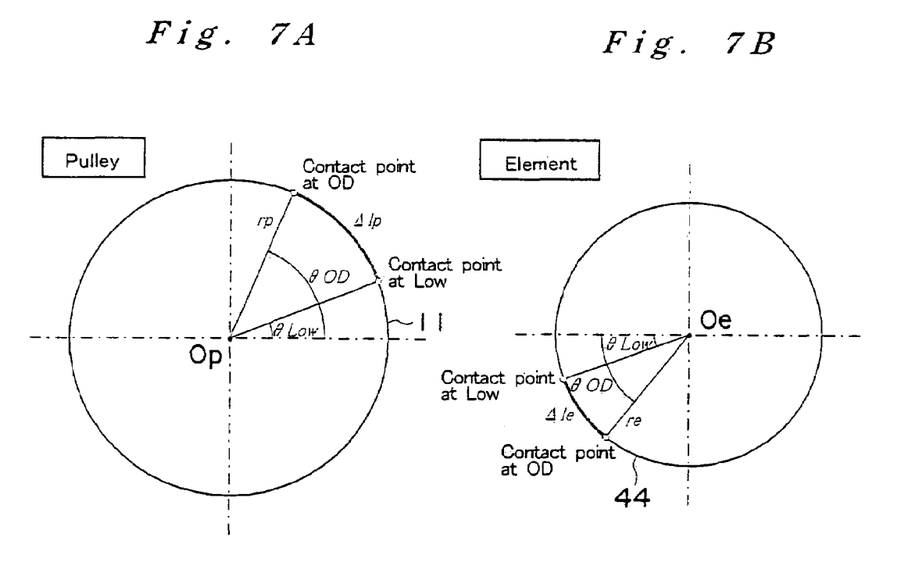
FIG. 7 are schematic diagrams describing the cross-sectional views of the V faces of the drive and driven pulleys and the elements.

FIG. 7 are schematic diagrams describing the sectional contours of the V faces 11 and 46 of the drive or driven pulley 5 or 8 and the element 40. For varying the speed change ratio of the transmission, the movable pulley halves 5B and 8B are moved axially to shift the contact point between the V faces 11 of the drive and driven pulleys 5 and 8 and the V faces 46 of the metal V belt 7 (elements 40) in the metal V-belt mechanism 4. In FIG. 7, the radii of the arcs of the V faces 11 and 46 of the pulleys 5 and 8 and the elements 40 are represented as rp and re, respectively, and the angles of the contact point with respect to the centers Op and Oe at the maximum speed change ratio (OD ratio) are represented as $\theta OD$, and those at the minimum speed change ratio (Low ratio) are represented as $\theta Low$. In this case, the distance (contact length) $\Delta lp$ over which the contact point migrates on the V faces 11 of the drive and driven pulleys 5 and 8 and the distance (contact length) $\Delta le$ over which the contact point migrates on the V faces 46 of the elements 40 are expressed as follows.

$$\Delta lp = rp \times |\theta OD - \theta Low| \quad (1)$$

$$\Delta le = re \times |\theta OD - \theta Low| \quad (2)$$

As mentioned above, while the two pulleys 5 and 8 and the metal V belt 7 (elements 40) are in the optimal contact condition, the centers Op and Oe of the V faces 11 and 46 and the contact point are always positioned in straight line. In this case, these θOD and θLow of the two pulleys 5 and 8 equal those of the elements 40, respectively, and the following equation is achieved.

$$\Delta le/\Delta lp = re/rp \tag{3}$$

Therefore, it is necessary to form the V faces 11 and 46 to satisfy this conditional expression (3) to achieve the optimal contact condition for the drive and driven pulleys 5 and 8 and the metal V belt 7 (elements 40). Here, by multiplying both the sides of the equation (3) with Δlp, the following equation (4) is achieved to express a relation.

$$\Delta le = \Delta lp \times re/rp \tag{4}$$

From this equation (4), it is understood that the contact length Δle on the V faces 46 of the elements 40 is determined from the contact length Δlp on the V faces 11 of the drive and driven pulleys 5 and 8. Here, the length of the V faces 11 of the two pulleys 5 and 8 is almost equal to the contact length thereof. Therefore, once the size of the pulleys is decided, the contact length Δle of the elements 40 is determined straight from the element/pulley curvature ratio (re/rp).

In this instance, it is preferable that the element/pulley curvature ratio (re/rp) satisfy the following equation (5).

$$0.02 < re/rp < 0.12 \tag{5}$$

Figure 8:
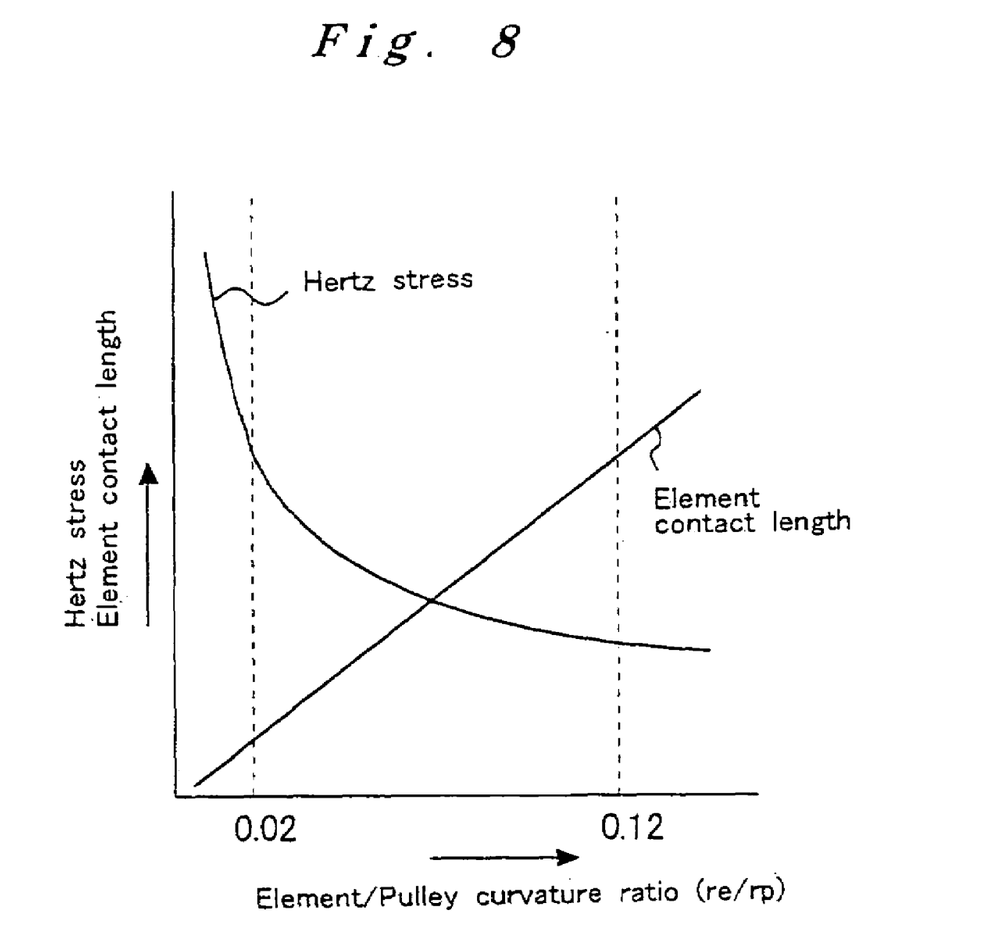
FIG. 8 is a graph showing relations of Hertz stress and the contact length of the elements to the element/pulley curvature ratio (re/rp).

FIG. 8 describes relations of the contact length Δle of the elements and the Hertz stress of the V face 46 at the contact point to the element/pulley curvature ratio (re/rp). If the curvature ratio is below the lower limit of the equation (5), then the Hertz stress of the V face 46 is excessive, and this condition can cause a fracture or an abnormal abrasion in the V faces 46 of the elements 40. On the other hand, if the curvature ratio is above the upper limit of the equation (5), then the contact length Δle of the elements 40 is excessive, and the size of the elements 40 must be large enough for accommodating this contact length. With such enlarged elements 40, it is impossible to achieve optimal speed change ratios.

In the metal V-belt mechanism 4, which is constructed as described above, the V faces 11 of the drive and driven pulleys 5 and 8 are formed such that the angle between the line tangential to the V face of the pulley and the line perpendicular to the axis of the pulley becomes smaller as the V face nears the axis of the pulley in cross-sectional view. Preferably, as shown in FIG. 3, the V face 11 is formed such that the center Op of the arc forming the V face 11 is located on the opposite side across the axis of the pulley. In this way, an improvement is made in transmission efficiency between the drive or driven pulley 5 or 8 and the metal V belt 7 when the metal V belt 7 is in contact at the innermost part of the V faces, i.e., the part closest to the axis of the pulley whose width has been extended all the way. In addition, this arrangement helps economize the pulley axial thrust because the arrangement acts to reduce the force maintaining the speed change ratio that is established with the metal V belt 7 being in contact at the outermost part of the drive or driven pulley 5 or 8 whose width has been contracted all the way. By the way, if the center Op of the arc forming the V face 11 were located near the axis of the pulley, then the line tangential to the V face at the part closest to the axis of the pulley would be almost perpendicular to the axis. In such a case, it would be impossible to shift the metal V belt 7 outwardly from the inner part of the V faces 11 of the drive or driven pulley 5 or 8 by the pulley axial thrust.

By setting the center Op of the arc forming the V faces 11 of the drive and driven pulleys 5 and 8 off from the axes of the pulleys, the V faces are formed as a segment of a circle and not as a complicated function.

Figure 5A:
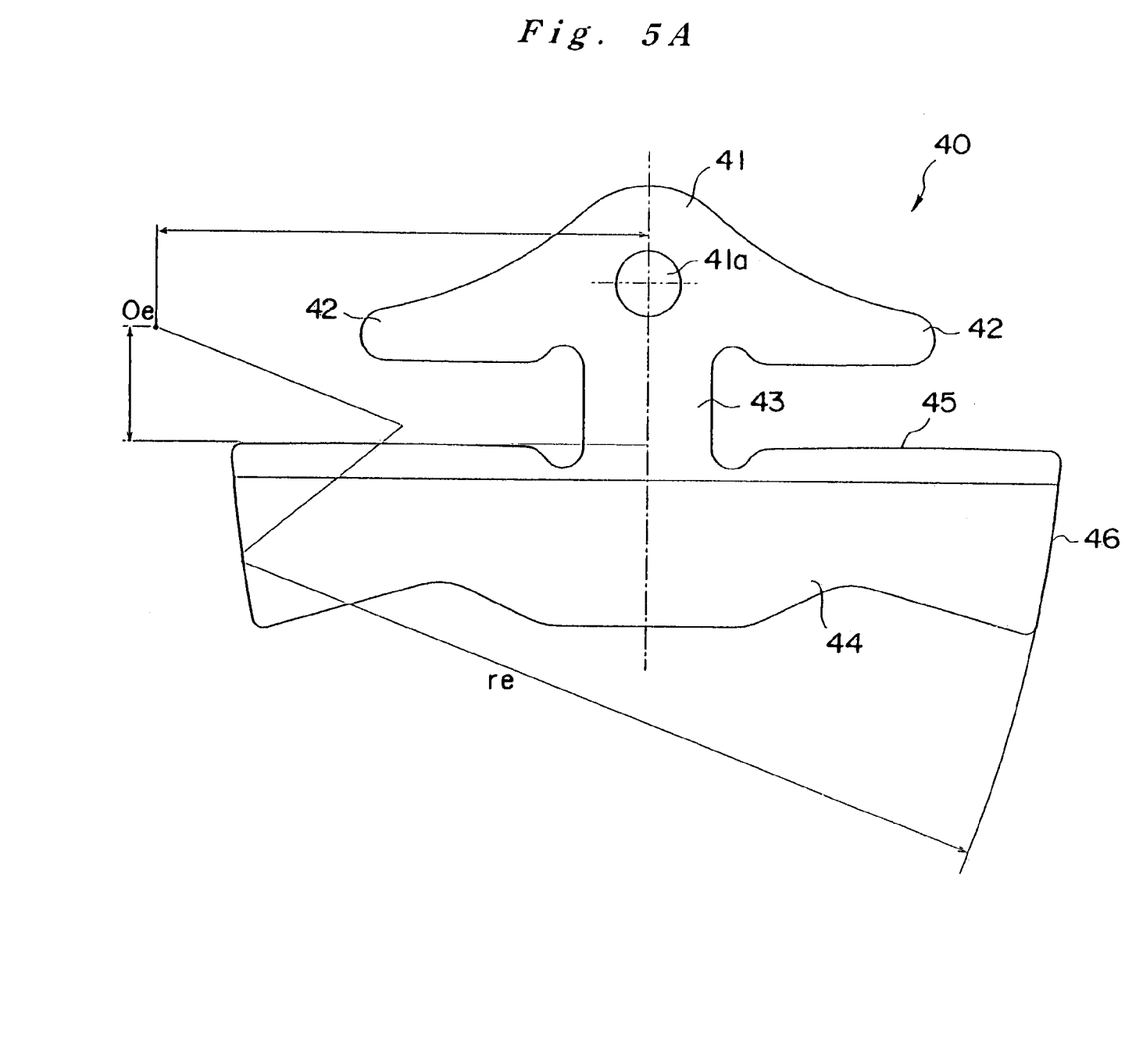
Figure 5B:
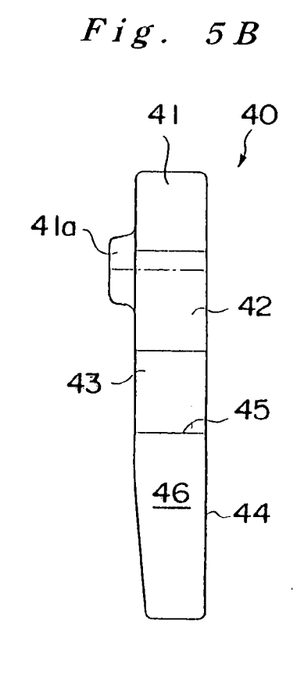

Furthermore, as shown in FIG. 5A, the center Oe of the arc forming the V face 46 of the element 40 is positioned off from the upper end of the saddle face 45 in the sectional contour perpendicular to the longitudinal direction of the V belt 7. In this way, also the V faces 46 are formed as a segment of a circle and not as a complicated function.

As described above, in the belt type continuously variable transmission according to the present invention, the contact surfaces of the drive and driven pulleys and the V belt are formed in arcs that are convex to each other to satisfy a predetermined condition. As a result, optimal contact condition is always maintained between the drive and driven pulleys and the V belt irrespective of the speed change ratio of the transmission, so the V belt does not experience misalignment. Therefore, without experiencing a fracture or abnormal abrasion, the belt type continuously variable transmission can achieve a sufficient range of speed change ratio. Because the contact surfaces of the pulleys and the V belt are formed simply in arcs, the production of these components are relatively easy.

Furthermore, the centers of the arcs forming the contact surfaces of the drive and driven pulleys, which surfaces are in contact with the V belt, are positioned away from the axes of the pulleys in the cross-sectional view through the axes of the pulleys to form the contact surfaces as a segment of a circle and not as a complicated function in sectional contour. In the same way, the centers of the arcs forming the contact surfaces of the V belt, which surfaces are in contact with the drive and driven pulleys, are positioned away from the upper ends of the saddle faces in the sectional view perpendicular to the longitudinal direction of the V belt. In this way, the contact surfaces of the V belt are also formed as a segment of a circle and not as a complicated function in sectional contour.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A belt type continuously variable transmission comprising a variable width drive pulley, a variable width driven pulley, and a V belt, which is disposed around said drive and driven pulleys;

wherein:

a contour of a contact surface being in contact with said V belt in a cross-sectional view through axes of said drive and driven pulleys is an arc that has a first radius of curvature rp and is convex to said V belt;

a contour of a contact surface being in contact with said drive and driven pulleys in a cross-sectional view perpendicular to a longitudinal direction of said V belt is an arc that has a second radius of curvature re and is convex to the contact surface of said drive and driven pulleys; and a contact point moving on the contact surfaces of said drive and driven pulleys and said V belt for a speed ratio change satisfies the following equation:

$$\Delta le/\Delta lp = re/rp$$

the Δlp being a distance over which said contact point migrates in the cross-sectional view through the axes of said drive and driven pulleys, and the Δle being a distance over which said contact point migrates in the cross-sectional view perpendicular to the longitudinal direction of said V belt, wherein the center Op of the arc having said first radius of curvature rp, which forms the contact surface in contact with said V belt in the cross-sectional view through the axes of said drive and driven pulleys, is positioned away from the axes of said drive and driven pulleys, and wherein said center Op is positioned on another side across the axes of said drive and driven pulleys opposite to a side of the contact surface in contact with said V belt.

2. The belt type continuously variable transmission as set forth in claim 1, wherein:

said V belt comprises a plurality of elements, which are connected in series, and a ring, which is placed on saddle faces of said elements; and the center Oe of the arc having said second radius of curvature re, which forms the contact surface in contact with said drive and driven pulleys in the cross-sectional view perpendicular to the longitudinal direction of said V belt, is positioned away from upper ends of said saddle faces.

3. The belt type continuously variable transmission as set forth in claim 2, wherein:

said center Oe is positioned away upward from the upper ends of said saddle faces.

4. The belt type continuously variable transmission as set forth in claim 1, wherein:

ratio of the radius of curvature re of said V belt to the radius of curvature rp of said drive and driven pulleys satisfies the following equation:

$$0.02 < re/rp < 0.12.$$

5. The belt type continuously variable transmission as set forth in claim 4, wherein:

the center Op of the arc having said first radius of curvature rp, which forms the contact surface in contact with said V belt in the cross-sectional view through the axes of said drive and driven pulleys, is positioned away from the axes of said drive and driven pulleys.

6. The belt type continuously variable transmission as set forth in claim 5, wherein:

said center Op is positioned on another side across the axes of said drive and driven pulleys opposite to a side of the contact surface in contact with said V belt.

7. The belt type continuously variable transmission as set forth in claim 4, wherein:

said V belt comprises a plurality of elements, which are connected in series, and a ring, which is placed on saddle faces of said elements; and the center Oe of the arc having said second radius of curvature re, which forms the contact surface in contact with said drive and driven pulleys in the cross-sectional view perpendicular to the longitudinal direction of said V belt, is positioned away from upper ends of said saddle faces.

8. The belt type continuously variable transmission as set forth in claim 7, wherein:

said center Oe is positioned away upward from the upper ends of said saddle faces.

9. The belt type continuously variable transmission as set forth in claim 1, wherein:

said contact surfaces are configured such that the center of said V belt in its longitudinal direction is always perpendicular to the axes of said drive and driven pulleys irrespective of speed change condition.

10. The belt type continuously variable transmission as set forth in claim 1, wherein:

said drive pulley comprises a drive side stationary pulley half, which is disposed axially immovable on a drive shaft, and a drive side movable pulley half, which is disposed on said drive shaft and axially movable with respect to said drive side stationary pulley half;

said driven pulley comprises a driven side stationary pulley half, which is disposed axially immovable on a driven shaft, and a driven side movable pulley half, which is disposed on said driven shaft and axially movable with respect to said driven side stationary pulley half;

said drive side stationary pulley half and said driven side movable pulley half are positioned to overlap each other in a direction perpendicular to the axes of said drive and driven pulleys; and said drive side movable pulley half and said driven side stationary pulley half are positioned to overlap each other in the direction perpendicular to said axes.

* * * * *